(12) United States Patent
Lin

(10) Patent No.: US 10,378,657 B2
(45) Date of Patent: Aug. 13, 2019

(54) VALVE PLUG ASSEMBLY AND SEAT RING FOR REGULATOR

(71) Applicant: EMERSON PROCESS MANAGEMENT REGULATOR TECHNOLOGIES, INC., McKinney, TX (US)

(72) Inventor: Chun Lin, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/469,305

(22) Filed: Mar. 24, 2017

(65) Prior Publication Data
US 2018/0274685 A1    Sep. 27, 2018

(51) Int. Cl.
| | |
|---|---|
| *F16K 1/12* | (2006.01) |
| *F16K 1/46* | (2006.01) |
| *F16K 25/00* | (2006.01) |
| *F16K 1/42* | (2006.01) |
| *G05D 16/06* | (2006.01) |

(52) U.S. Cl.
CPC .............. *F16K 1/46* (2013.01); *F16K 1/12* (2013.01); *F16K 1/42* (2013.01); *F16K 25/00* (2013.01); *G05D 16/0638* (2013.01)

(58) Field of Classification Search
CPC ..... F16K 1/12; F16K 1/46; F16K 1/42; F16K 25/00; F16K 25/005; F16K 25/02; F16K 25/04; G05D 16/0638
USPC .................. 251/333, 334, 357; 277/372, 445
See application file for complete search history.

(56) References Cited

U.S. PATENT DOCUMENTS

| | | | | |
|---|---|---|---|---|
| 933,863 | A | * | 9/1909 | Thompson ................ F16K 1/42 251/333 |
| 3,945,607 | A | * | 3/1976 | Dashner .................... F16K 1/46 251/357 |
| 4,249,717 | A | * | 2/1981 | Thompson .............. F16K 25/00 251/210 |
| 4,335,744 | A | | 6/1982 | Bey |

(Continued)

FOREIGN PATENT DOCUMENTS

WO    WO-2009/035864 A2    3/2009

OTHER PUBLICATIONS

International Search Report and Written Opinion, corresponding to International Application No. PCT/US2018/022868, dated Jun. 28, 2018.

*Primary Examiner* — Michael R Reid
(74) *Attorney, Agent, or Firm* — Marshall, Gerstein & Borun LLP

(57) ABSTRACT

A valve plug assembly adapted for sealing engagement with a seat ring. The valve plug assembly includes a valve plug having a sealing disk adapted to engage a seating surface the seat ring. The seating surface of the seat ring has a primary portion with a primary angle of any one of about 20 degrees to about 45 degrees and a secondary portion extending from the primary portion with a secondary angle of about 10 degrees. A retainer is coupled to the valve plug and includes a body having a first portion, a second portion, and a side extending from the first portion to the second portion at one of an angle of about 30 degrees to about 45 degrees. So configured, the stress acting on the sealing surface is reduced, increasing the service life of the sealing disk.

20 Claims, 7 Drawing Sheets

(56) References Cited

U.S. PATENT DOCUMENTS

| | | | |
|---|---|---|---|
| 7,537,194 B2 * | 5/2009 | Nagai | F16K 1/38 |
| | | | 251/122 |
| 9,915,389 B1 * | 3/2018 | Lin | F16L 55/027 |
| 2008/0257424 A1 | 10/2008 | Quijano | |
| 2009/0065073 A1 * | 3/2009 | Davis | F16K 1/36 |
| | | | 137/505 |
| 2014/0130917 A1 | 5/2014 | Lively et al. | |
| 2015/0285402 A1 * | 10/2015 | Roper | F16K 1/46 |
| | | | 251/333 |

* cited by examiner

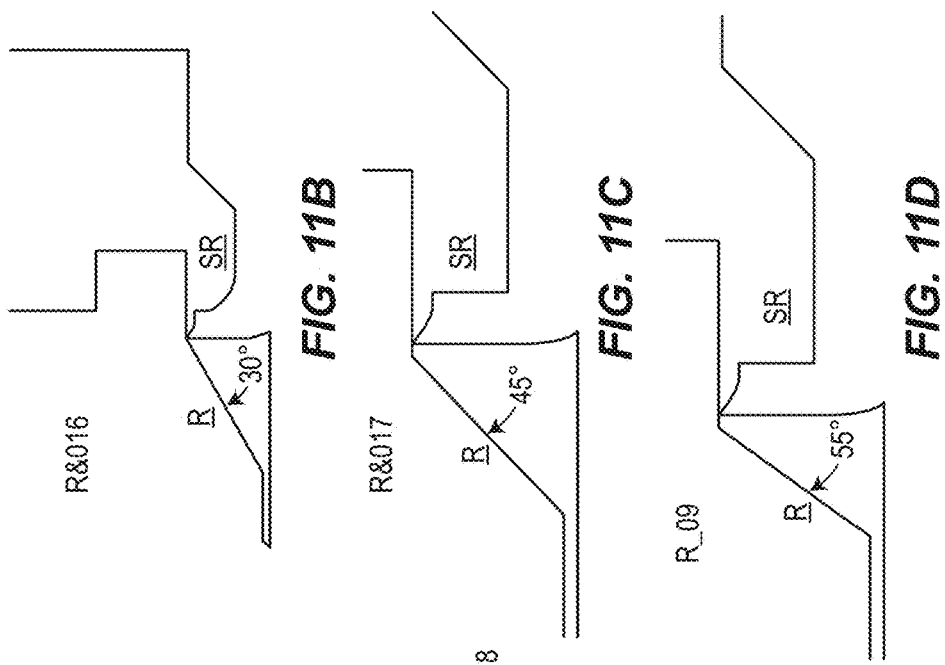
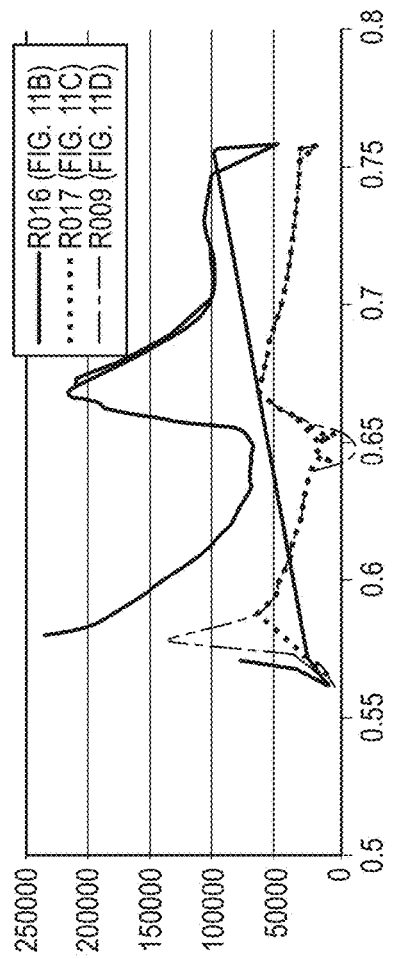
FIG. 11B
FIG. 11C
FIG. 11D
FIG. 11A

US 10,378,657 B2

VALVE PLUG ASSEMBLY AND SEAT RING FOR REGULATOR

FIELD OF THE DISCLOSURE

The present disclosure generally relates to fluid control devices and, more particularly, to an improved valve seat and disk retainer for a fluid control device.

BACKGROUND

Fluid control devices include various categories of equipment with control valves and regulators. Such control devices are adapted to be coupled within a fluid process control system such as chemical treatment systems, natural gas delivery systems, etc., for controlling the flow of a fluid therethrough. Each control device includes a body defining a fluid flow-path and a control member assembly for adjusting a dimension of the flow-path. A seat ring is disposed within a throat of the valve body.

The control member assembly typically includes a valve plug assembly having a sealing disk with a sealing surface. When the outlet pressure of the valve body is high, a sealing surface of the sealing disk may sealingly engage the seat ring and close the throat. This prevents the flow of fluid through the regulator.

While the flow of fluid through the regulator is prevented when the sealing disk engages the seat ring, high pressure force from the fluid often still acts on any exposed external surfaces of the sealing disk. Such forces causes erosion and chunking, for example, of the sealing disk, as depicted on the sealing disks 10, 12, 14 and 16 of FIG. 1. As a result, the sealing disks of the conventional valve plug assemblies need to be serviced and/or replaced more often, reducing the service life and efficiency of the valve plug assembly and, ultimately, the fluid control device.

SUMMARY OF THE DISCLOSURE

In one aspect of the present disclosure, a valve plug assembly adapted for sealing engagement with a seat ring includes a valve plug and a retainer coupled to the valve plug. The valve plug has a cylindrical body, an annular flange radially extending from the body, and a sealing disk disposed within the annular flange. The sealing disk has a sealing surface adapted to engage a seating surface of the seat ring, and the seating surface of the seat ring has a primary portion with a primary angle of about 20 degrees to about 45 degrees. The retainer secures the valve plug to a mounting portion, the retainer having a body with a first portion, a second portion and an annular side extending from the first portion to the second portion at one of an angle at or between about 30 degrees to about 45 degrees.

According to another aspect of the present disclosure, a fluid control device comprises a valve body defining a flow path for a fluid and a seat ring disposed within the flow path and having a seating surface, the seating surface of the seat ring having a primary portion with a primary angle of about 20 degrees to about 45 degrees. An actuator is coupled to the valve body and includes a control assembly adapted for displacement relative to the seat ring for regulating a flow of the fluid through the flow-path. The control assembly includes a mounting portion and a valve plug assembly coupled to the mounting portion and adapted to sealingly engage the seat ring. The valve plug assembly includes a valve plug having a cylindrical body, an annular flange radially extending from the body, and a sealing disk disposed within the annular flange. The sealing disk has a sealing surface adapted to engage the seating surface of the seat ring. A retainer is coupled to the valve plug to secure the valve plug to the mounting portion. The retainer has a body with a first portion, a second portion, and an annular side extending from the first portion to the second portion at any one of about 30 degrees to about 45 degrees.

In further accordance with any one or more of the foregoing first and second aspects, one or more of the valve plug assembly or the fluid control device may include any one or more of the following forms.

According to one aspect, the seat ring has a longitudinal axis A, and the primary angle of the primary portion of the seating surface may extends any one of at or between about 20 degrees to about 45 degrees from the longitudinal axis A of the seat ring. In addition, the primary angle of the primary portion of the seating surface may be about 45 degrees. Further, the seat ring may include a longitudinal axis A and a lateral axis B perpendicular to the longitudinal axis A of the seat ring. Still further, the seat ring may further comprise a secondary portion extending from the primary portion at an angle of about 10 degrees from the lateral axis B of the seat ring. Also, the primary portion may extend from the longitudinal axis A of the seat ring at an angle of about 45 degrees in another example.

According to another aspect, the primary portion may extend from the longitudinal axis A of the seat ring at an angle of about 30 degrees. In addition, the retainer may include a lateral axis C parallel to the lateral axis B of the seat ring. In this example, the annular side may extend from the first portion to the second portion at an angle of about 30 degrees or about 45 degrees from the first portion.

According to yet another aspect, the primary angle of the primary portion of the seating surface of the seat ring may be about 45 degrees. In this example, the annular side of the retainer may extend from the first portion to second portion at an angle of about 45 degrees. Further, the seating surface may further include a secondary portion. The secondary portion may extend outwardly from the primary portion at a secondary angle of about 10 degrees.

According to other aspects of the present disclosure, the first portion of the retainer may contact the sealing surface of the valve plug. In addition, the seat ring may further include a first end and a second end, the first end including the primary portion and the second end having a tapered surface.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the example embodiments, except as may be explicitly delineated in the corresponding written description. Also, none of the drawings is necessarily to scale.

FIG. 11A is a graph depicting the shear stress acting on the sealing disk of various retainer and seat ring configurations;

FIG. 11B is a close-up, sectional view of a retainer and seat ring configuration, the retainer having a side disposed at an angle of 30 degrees from an axis of the retainer;

FIG. 11C is a close-up, sectional view of a retainer and seat ring configuration, the retainer having a side disposed at an angle of 45 degrees from an axis of the retainer; and FIG. 11D is a close-up, sectional view of a retainer and seat ring configuration, the retainer having a side disposed at an angle of 55 degrees from an axis of the retainer.

DETAILED DESCRIPTION OF THE DISCLOSURE

Generally, a new valve plug assembly adapted for sealing engagement with a new seat ring is disclosed. The valve plug assembly includes a valve plug having a sealing disk adapted to engage a seating surface the seat ring. The seating surface of the seat ring has a primary portion with a primary angle of any one of about 20 degrees to about 45 degrees from an axis of the seat ring and a secondary portion extending from the primary portion with a secondary angle of about 10 degrees from an axis of the seat ring. The valve plug assembly further includes a retainer coupled to the valve plug. The retainer includes a body having a first portion, a second portion, and a side extending from the first portion to the second portion at one of an angle of about 30 degrees to about 45 degrees from an axis of the retainer. So configured, when the sealing disk of the valve plug contacts the seating surface of the seat ring, the amount of stress (from fluid flow, for example) acting on the sealing surface is reduced, increasing the service life of the sealing disk.

Figure 1:
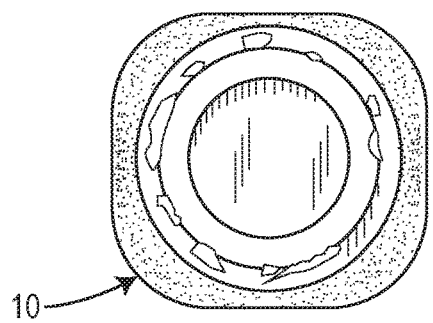
FIG. 1 depicts various conventional sealing disks used with fluid flow control devices, the sealing disks each having at least erosion due to high pressure fluid force during operation of the fluid control devices.
Figure 1:
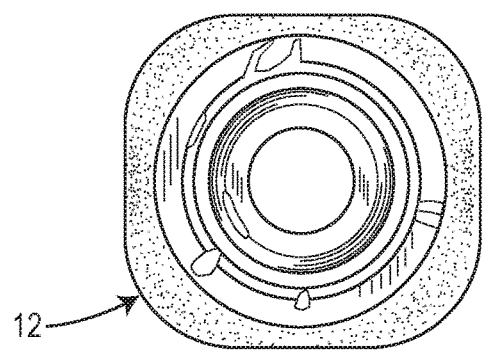
Figure 1:
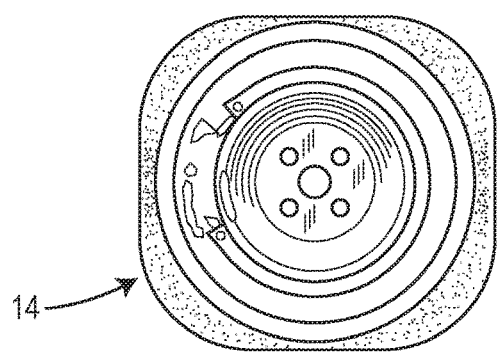
Figure 1:
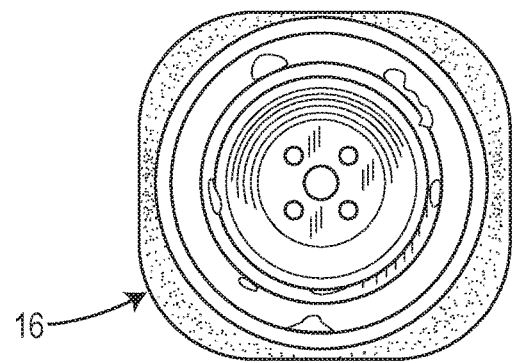
Figure 2:
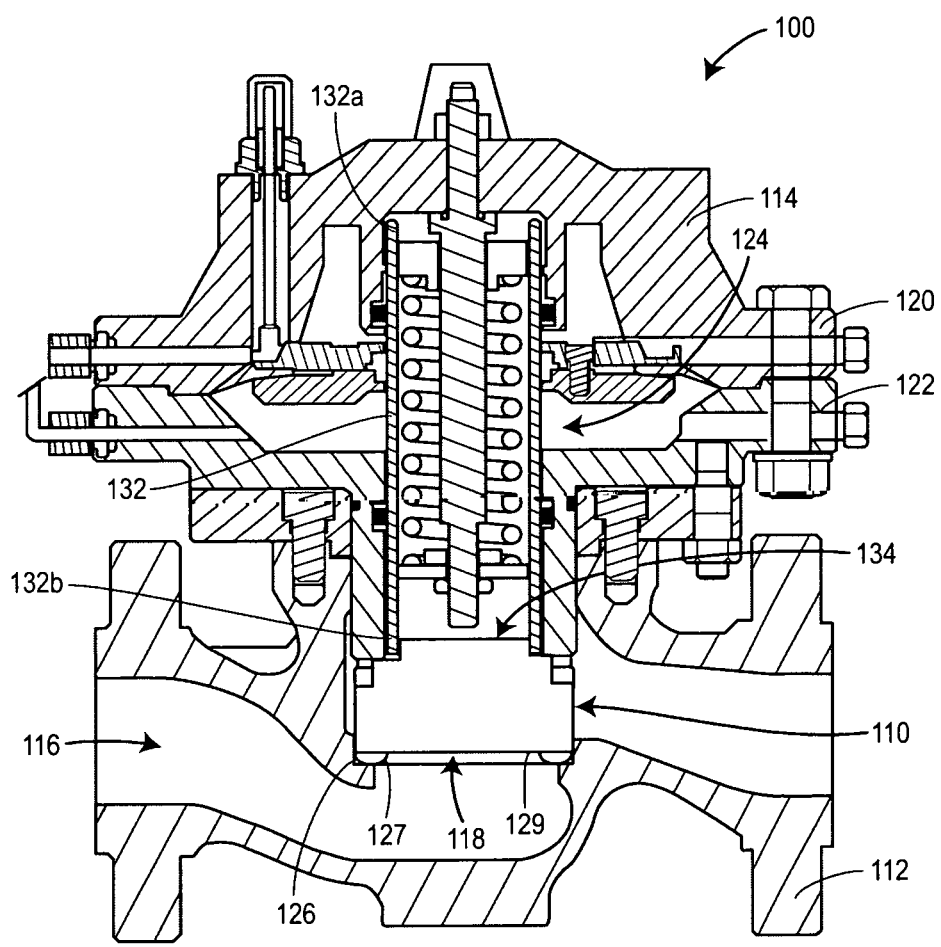
FIG. 2 is a sectional view of a fluid flow control device having a valve plug assembly and seat ring of the present disclosure.

Referring now to FIG. 2, a fluid flow control device or regulator assembly 100 including a valve plug assembly 110 of the present disclosure is depicted. The regulator assembly includes a valve body 112 and an actuator 114. The valve body 112 defines a flow-path 116 and includes a throat 118. In FIG. 2, the regulator assembly 100 is configured in a flow-up configuration. The actuator 114 includes an upper actuator casing 120, a lower actuator casing 122, and a control member assembly 124. The control member assembly 124 is disposed within the upper and lower actuator casings 120, 122 and is adapted for bi-directional displacement in response to changes in pressure across the regulator assembly 100. So configured, the control member assembly 124 controls the flow of fluid through the throat 118. Additionally, as is depicted, the regulator assembly 100 includes a seat ring 126 (depicted in part) disposed in the throat 118 of the valve body 112. When the outlet pressure of the valve body 112 is high, a sealing surface of the control member assembly 124 may sealingly engage the seat ring 126 and close the throat 118, as described more below, to prevent the flow of fluid through the regulator 100.

Figure 3:
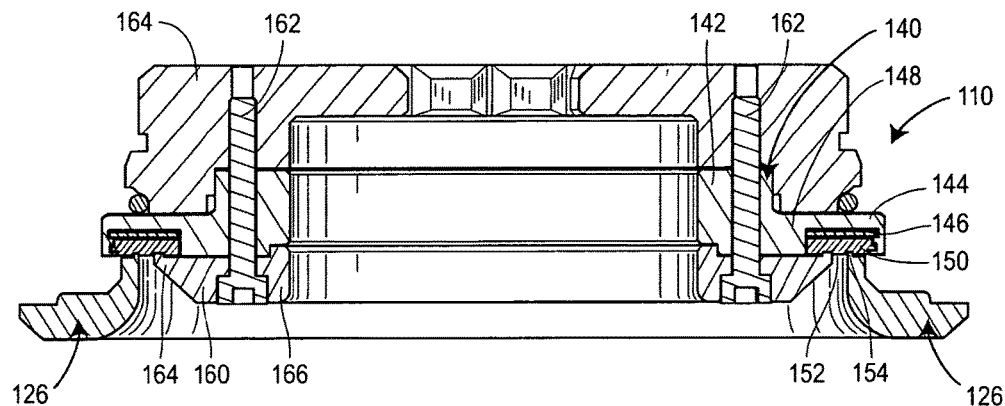
FIG. 3 is a close-up sectional view of the valve plug assembly and seat ring of the present disclosure, a sealing disk of the valve plug assembly in contact with the seat ring.

The seat ring 126 depicted in FIG. 2 further includes a partially rounded or tapered surface 127. The rounded or tapered surface 127 serves to streamline the flow of the fluid through an orifice 129. As fluid flows through the valve body 112, it flows from the left of the valve body 112, as depicted in FIG. 3, and up through the throat 118 via the orifice 129 in the seat ring 126. Then, the fluid deflects off a lower surface of the control member 124, and out to the right of the valve body 112 of FIG. 2.

Generally, the control member assembly 124 is adapted to be engaged by a seating surface 154 (FIGS. 3 and 4) of the seat ring 126 when the control member assembly 124 is in a closed position, preventing the fluid from flowing through the valve body 112. More specifically, the control member assembly 124 further includes a tubular member 132, a mounting subassembly 134, and the valve plug assembly 110, e.g., disk holder assembly. The tubular member 132 includes an upper end 132a and a lower end 132b. The lower end 132b is open and accommodates the mounting subassembly 134. The valve plug assembly 110 is coupled to the mounting subassembly 134, for example, as generally depicted in FIG. 2.

Figure 4:
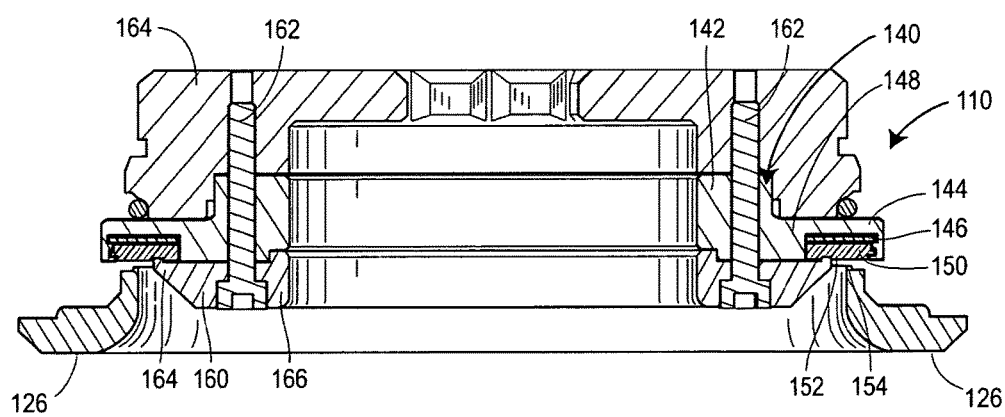
FIG. 4 is another close-up sectional view of the valve plug assembly and seat ring of the present disclosure, the sealing disk of the valve plug assembly not in contact with the seat ring.

Referring now to FIGS. 3 and 4, the valve plug assembly 110 referenced in FIG. 2 is depicted in detail. More specifically, FIG. 3 depicts the valve plug assembly 110 in contact with, such as in sealing engagement with, the seat ring 126. Said another way, in FIG. 3 the valve plug assembly 110 is in a closed position. FIG. 4 depicts the valve plug assembly 110 not in contact with, such as in sealing engagement with, the seat ring 126. Said another way, in FIG. 4 the valve plug assembly 110 is in an open position. As depicted in both FIGS. 3 and 4, the valve plug assembly 110 includes a valve plug 140 having a cylindrical body 142 and an annular flange 144 extending from the body 142. In one example, the annular flange 144 includes a groove 146. The groove 146 may be disposed in a bottom portion 148 of the annular flange 144, as depicted in FIG. 3, or another portion of the annular flange 144 and still fall within the scope of the present disclosure.

A sealing disk 150 is disposed within the groove 146 and includes a sealing surface 152. The sealing surface 152 of the sealing disk 150 is adapted to engage the seating surface 154 of the seat ring 126, as explained in more detail below. As one of ordinary skill in the art will appreciate, the sealing disk 150 may include a generally ring-shaped disk made of resilient material, such as polyurethane or nitrile rubber at least in part. In addition, and in one example, the sealing disk 150 may be fixed or bonded to the valve plug 140. Optionally, the sealing disk 150 may be disposed in another portion of the annular flange 144 in the absence of a groove or other similar part in the annular flange 144, for example, and still fall within the scope of the present disclosure.

Still referring to FIGS. 3 and 4, the valve plug assembly 110 further includes a retainer 160. The retainer 160 is coupled to the valve plug 140 via fasteners 162, for example, which also secures the valve plug 140 to a mounting portion 164 of the mounting subassembly 134 (FIG. 2). In one example, the fasteners 162 include threaded bolts and screws. As one of ordinary skill in the art will understand, various other fasteners capable of securing the valve plug 140 to the mounting portion 164, for example, may alternatively be used and still fall within the scope of the present disclosure.

The retainer 160 includes a body 166 having a portion 167 that contacts the sealing surface 152 of the sealing disk 150 of the valve plug 140 when both the sealing surface 152 contacts the seat ring 126, as depicted in FIG. 3, and when the sealing surface 152 is not in contact with the seat ring 126, as depicted in FIG. 4.

Figure 5:
FIG. 5 is a sectional view of a seat ring that may be used with the valve plug assembly of FIG. 3.

Referring now to FIG. 5, a sectional view of the seat ring 126 of FIGS. 3 and 4, for example, is depicted. The seat ring 126 includes a body 170 having the seating surface 154 that contacts the sealing surface 152 of the sealing disk 150 when the valve plug assembly 110 is in the closed position of FIG. 3, for example, as described above. The seating surface 154 includes a primary portion 172 disposed at a first end 174 of the seat ring 126. The seat ring 126 further includes a second end 176 and a portion 178 disposed between the first end 174 and the second end 176 that may include a rounded or tapered surface 179. The rounded or tapered surface 179 serves to streamline the flow of the fluid through the orifice 129 (FIG. 2) of the fluid control valve 100.

Figure 6:
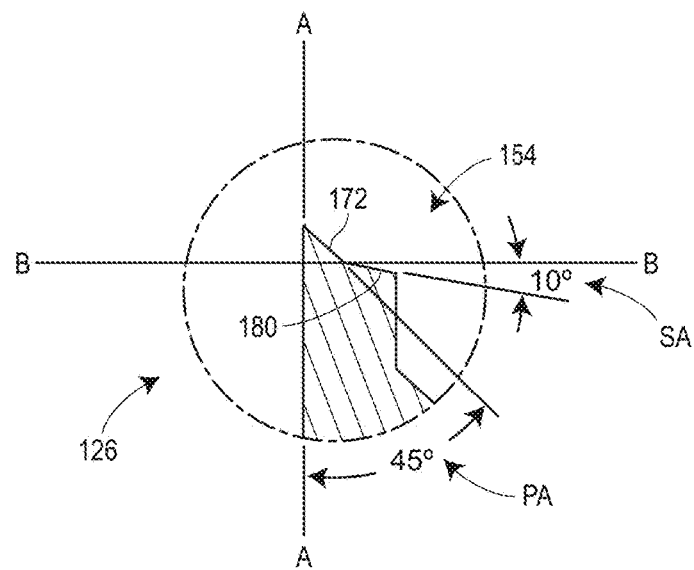
FIG. 6 is a close-up view of a portion of the seat ring of FIG. 5 labeled A.

Referring now to FIG. 6, a close-up view of a portion of the seat ring 126 of FIG. 5 labeled B is depicted. The primary portion 172 of the seating portion 154 of the seat ring 126 includes a primary angle PA extending any one of at or between about 20 degrees to about 45 degrees from a longitudinal axis A of the seat ring 126. In the example depicted in FIG. 6, the primary angle PA of the primary portion 172 is about 45 degrees from the longitudinal axis A of the seat ring 126. In another example, although not depicted, the primary angle PA of the primary portion 172 is about 20 degrees from the longitudinal axis of the seat ring 126, and in yet another example, the primary angle PA is about 30 degrees.

As further depicted in FIG. 6, the seat ring 126 further includes a lateral axis B that is perpendicular to the longitudinal axis A of the seat ring 126. In addition, the seat ring 126 further includes a secondary portion 180 extending from the primary portion 172 at an angle of about 10 degrees from the lateral axis B of the seat ring 126. While the secondary portion 180 is depicted as having a secondary angle SA extending at angle of about 10 degrees, the secondary portion may alternatively extend from the primary portion 172 and the lateral axis B of the seat ring at an angle at any one or between five degrees and 20 degrees and still fall within the scope of the present disclosure.

Figure 7:
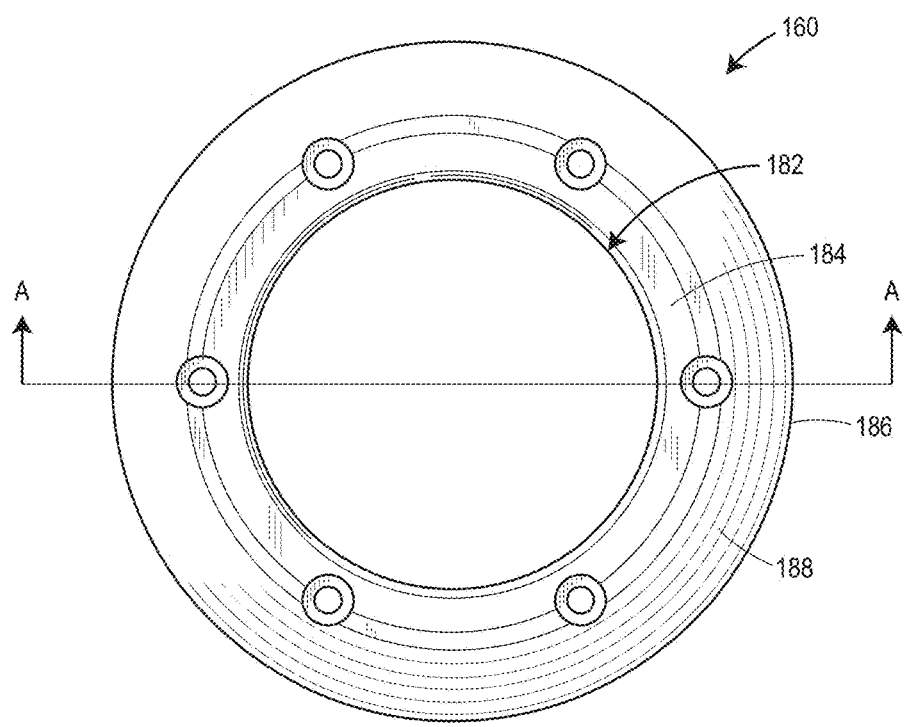
FIG. 7 is a top view of a retainer that may be a part of the valve plug assembly of FIG. 3.
Figure 8:
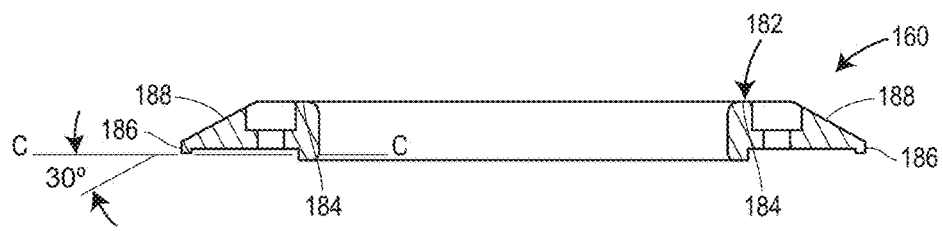
FIG. 8 is a sectional view of the retainer of FIG. 7 taken along the line A-A of FIG. 7.

Referring now to FIGS. 7 and 8, the retainer 160 of FIGS. 3 and 4, for example, is depicted. More specifically, the retainer 160 includes a body 182, such as a cylindrical body, having a first portion 184, a second portion 186, and an annular side 188, such as a side edge. The annular side 188 extends from the first portion 184 to the second portion 186 at an angle any one of at or between about 30 degrees to about 45 degrees from an axis C (FIG. 8) of the retainer 160. More specifically, and as depicted in FIG. 8, the annular side 188 extends from the first portion 184 to the second portion 186 at an angle of about 30 degrees from the axis C of the retainer 160. In this example, the axis C of the retainer 160 is parallel to the lateral axis B of the seat ring 126, when the valve plug assembly 110 is disposed within the fluid control device 100, for example.

Figure 9:
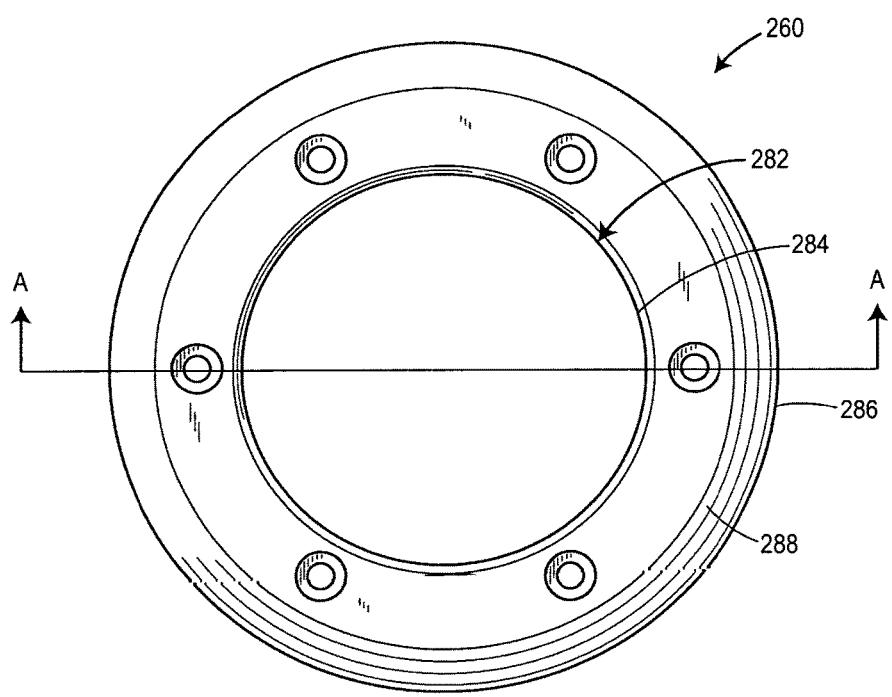
FIG. 9 is a top view of another retainer that may be a part of the valve plug assembly of FIG. 3.
Figure 10:
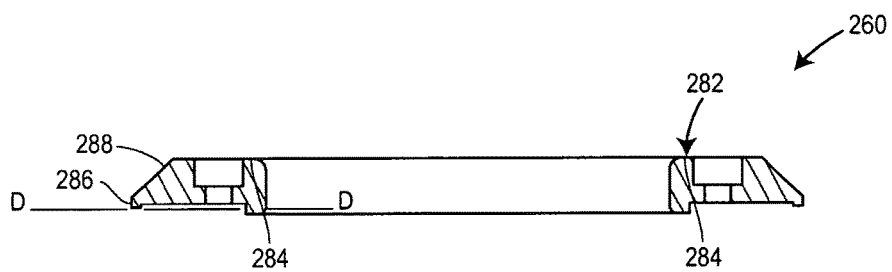
FIG. 10 is a sectional view of the retainer of FIG. 9 taken along the line B-B of FIG. 9.

Referring now to FIGS. 9 and 10, another retainer 260 that may alternatively be used to secure the valve plug 140 to the mounting portion 164 (FIGS. 3 and 4) is depicted. The retainer 260 is similar to, if not the same as; the retainer 160 of FIGS. 7 and 8, except the retainer 260 includes an annular side that extends at an angle of about 45 degrees from an axis D of the retainer 260, as explained more below. Thus, for the sake of brevity, parts of the retainer 260 that are identical to or very similar to parts of the retainer 160 have reference numbers 100 more than the reference numbers of the retainer 160.

More specifically, and like the retainer 160, the retainer 260 includes a body 282, such as a cylindrical body, having a first portion 284, a second portion 286, and an annular side 288, such as a side edge. The annular side 288 extends from the first portion 284 to the second portion 286 at an angle of about 45 degrees from an axis D of the retainer 260.

In one example, the valve plug assembly 110 (FIGS. 3 and 4) includes the retainer 260 having the annular side 288 extending from the first portion 284 at an angle of about 45 degrees from the axis D of the retainer 260 (FIGS. 9 and 10), and the primary angle PA of the primary portion 154 of the seat ring 126 is about 45 degrees from the longitudinal axis A of the seat ring 126. In the same example, the secondary angle SA of the secondary portion 180 extending from the primary portion 172 is 10 degrees from the lateral axis B of the seat ring 126.

In another example, the valve plug assembly 110 (FIGS. 3 and 4) includes the retainer 260 having the annular side 288 extending from the first portion 284 at an angle of about 45 degrees from the axis C of the retainer 260, and the primary angle PA of the primary portion 154 of the seat ring 126 is about 30 degrees from the longitudinal axis A of the seat ring 126 (FIG. 6). In the same example, the secondary angle SA of the secondary portion 180 extending from the primary portion 172 is 10 degrees from the lateral axis B of the seat ring 126.

In yet another example, the valve plug assembly 110 (FIGS. 3 and 4) includes the retainer 160 (FIGS. 7 and 8) having the annular side 188 extending from the first portion 184 at angle of about 30 degrees from the axis C of the retainer 160, and the primary angle PA the primary angle PA of the primary portion 154 of the seat ring 126 is about 45 degrees from the longitudinal axis A of the seat ring 126. In the same example, the secondary angle SA of the secondary portion 180 extending from the primary portion 172 is 10 degrees from the lateral axis B of the seat ring 126.

In still another example, the valve plug assembly 110 (FIGS. 3 and 4) includes the retainer 160 (FIGS. 7 and 8) having the annular side 188 extending from the first portion 184 at angle of about 30 degrees from the axis C of the retainer 160, and the primary angle PA of the primary portion 154 of the seat ring 126 is about 30 degrees from the longitudinal axis A of the seat ring 126. In the same example, the secondary angle SA of the secondary portion 180 extending from the primary portion 172 is 10 degrees from the lateral axis B of the seat ring 126.

Referring now to FIGS. 11A-11D, a graph depicting an amount of shear stress acting on a sealing disk, such as the sealing disk 150, depending upon some of the various seat ring and retainer configurations described above is provided in FIG. 11A. Each of the various seat ring and retainer design combinations graphically represented in FIG. 11A are depicted in a close-up, sectional view in FIGS. 11B-11D, as explained more below. More specifically, in FIG. 11A, the X-axis represents the sealing disk distance to a center line of the fluid flow device, such as the fluid control device 100. The Y-axis represents the amount of sheer stress acting of the sealing disk, such as the sealing disk 150, when the fluid control device 100 has an inlet pressure of 1500 psig, an outlet pressure of 100 psig, and a temperature range of −20 degrees Fahrenheit to 160 degrees Fahrenheit for each of the various seat ring and retainer designs.

FIG. 11B, which is also labeled R&O16, depicts a close-up view of a retainer R and seat ring SR combination, the retainer R having a side, such as a side edge, disposed at an angle of 30 degrees from an axis of the retainer R. The seat ring SR includes a sealing portion having a primary portion with a primary angle that may be any of at or between about 20 degrees to about 45 degrees. Having the retainer with a side disposed at an angle of 30 degrees results in initially higher shear stress on the sealing disk at 0.57 inches, for example, but then is immediately reduced between 0.58-0.65 inches with no vacuum condition at any point. A vacuum condition occurs when the sealing disk is significantly pulled in a direction, for example, such as a downward direction. This is represented in FIG. 11A when the shear force measurement on the Y-axis is reduced to a negative value at any point along the X-axis, for example. As depicted in FIG. 11A, the retainer depicted in FIG. 11B, which is represented as RO16 on the graph of FIG. 11A, does not have any measured shear force having a negative value. As a result, there is no vacuum condition for the retainer and seat ring combination of FIG. 11B. This combination retainer and seat ring of FIG. 11B results in less stress, erosion and wear on the sealing disk, increasing the service life of the sealing disk and, ultimately, the fluid control device.

Referring now to FIG. 11C, which is also labeled R&O17, another close-up view of another retainer R and seat ring SR combination is depicted. In this example, the retainer R includes a side, such as a side edge, disposed at an angle of 45 degrees from an axis of the retainer R. The seat ring SR includes a sealing portion having a primary portion with a primary angle that may be any of at or between about 20 degrees to about 45 degrees, for example. Having the retainer R configured to have the side disposed at an angle of 45 degrees results in an overall lower amount of shear stress being applied to the sealing disk, such as the sealing disk 150, in essentially every point of the sealing disk measured, e.g., at every point from 0.55 inches to 0.75 inches from a center portion of the fluid control device, as compared to shear stress on the sealing disk when using the retainer R depicted in FIG. 11B. More specifically, and as depicted in the graph of FIG. 11A, the shear stress on the sealing disk is reduced significantly through 0.75 inches, for example. In addition, and like the retainer R depicted in FIG. 11B, there is also no vacuum condition at any point along the sealing disk with the retainer R of FIG. 11C. As a result, this combination retainer R and seat ring SR of FIG. 11C also results in less erosion and wear on the sealing disk, even less than that of the retainer R of FIG. 11B, increasing the service life of the sealing disk and, ultimately, the fluid control device.

Referring now to FIG. 11D, which is also labeled R_09, another close-up view of another retainer R and seat ring SR combination is depicted. In this example, the retainer R includes a side, such as a side edge, disposed at an angle of 55 degrees from an axis of the retainer R. The seat ring SR includes a sealing portion having a primary portion with a primary angle that may be any of at or between about 20 degrees to about 45 degrees, for example. Having the retainer R with the side disposed at an angle of 55 degrees results in an initially higher shear stress being applied to the sealing disk, such as the sealing disk 150, than the retainer of FIG. 11C, for example, as depicted in the graph of FIG. 11A. This initially higher shear stress on the sealing disk is then reduced, as further depicted in FIG. 11A, and a vacuum condition occurs at about 0.65 inches on the X-axis, for example. Said another way, at about 0.65 inches from a center line or center portion of the fluid control device, the shear stress acting on the sealing disk is reduced so greatly that a negative amount of shear stress is measured, resulting in strong pulling forces being applied to the sealing disk. As is known, such forces may cause deformation and other damage, for example. As a result, having the retainer R of FIG. 11D is not preferred, as more damage to the sealing disk would occur, resulting reduced service life of the sealing disk and fluid control device.

In addition, it was found that having a retainer with the design depicted in FIG. 11C and describe above, for example, along with the primary portion of the sealing surface of the seat ring having an angle of 45 degrees resulted in an optimal configuration. Said another way, this configuration results in the least amount of shear stress being applied to the sealing disk without any vacuum condition along the length of the sealing disk. As such, in one example, this is the optimal configuration for increasing the service life of the sealing disk and the fluid control device.

While the retainers of FIGS. 11B-11C, for example, are 1 inch retainers, one of ordinary skill in the art will appreciate that the retainers may alternatively be various other sizes, such as 4 inch retainers, and still have the same results described above and fall within the scope of the present disclosure. In addition, while the foregoing is generally described as for use with a regulator assembly, in one example, the regulator is from the EZH regulator product line of Emerson Process Management Regulator Technologies.

In view of the foregoing, one of ordinary skill in the art will appreciate at least the following advantages of the present disclosure. In particular, the various retainer and seat ring designs described above and depicted in FIGS. 2-10, for example, improve the service life of the sealing disk and reduce the overall stress acting on the sealing disk. In addition, such retainer and seat ring combinations/designs still provide a tight shut-off on the sealing disk, such as a polyurethane sealing disk, while operating within a temperature range of −20 degrees F. to 160 degrees F. and a pressure range of up to 1650 psig. Moreover, having a secondary portion of the sealing surface of the seat ring with a secondary angle of about 10 degrees (as fully described above) further protects the sealing disk, such as the sealing disk 150, from an overstress condition.

In light of the foregoing, the description of the present disclosure should be understood as merely providing examples of the present invention and, thus, variations that do not depart from the gist of the invention are intended to be within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

While various embodiments have been described herein, it is understood that the appended claims are not intended to be limited thereto, and may include variations that are still within the literal or equivalent scope of the claims.

What is claimed:

1. A valve plug assembly adapted for sealing engagement with a seat ring, the valve plug assembly comprising:
   a valve plug having a cylindrical body, an annular flange radially extending from the body, and a sealing disk disposed within the annular flange, the sealing disk having a sealing surface adapted to engage a seating surface of the seat ring, the seating surface of the seat ring having a primary portion with a primary angle extending any one of at or between 20 degrees to 45 degrees from a longitudinal axis (A) of the seat ring, and a secondary portion extending from a bottom end of the primary portion so as to form an obtuse angled recess facing the sealing surface of the sealing disk at a non-parallel angle from a lateral axis (B) of the seat ring; and
   a retainer coupled to the valve plug to secure the valve plug to a mounting portion, the retainer having a body with a first portion, a second portion and an annular side extending from the first portion to the second portion at one of an angle at or between 30 degrees to 45 degrees.

2. The device of claim 1, wherein the first portion of the retainer contacts the sealing surface of the sealing disk.

3. The valve plug assembly of claim 1, wherein the primary angle of the primary portion of the seating surface is 45 degrees.

4. The valve plug assembly of claim 1, wherein the lateral axis (B) is perpendicular to the longitudinal axis (A) of the seat ring.

5. The valve plug assembly of claim 4, wherein the secondary portion extends from the primary portion at an angle of 10 degrees from the lateral axis (B) of the seat ring.

6. The valve plug assembly of claim 4, wherein the primary portion extends from the longitudinal axis (A) of the seat ring at one of an angle of 30 degrees or an angle of 45 degrees.

7. The valve plug assembly of claim 1, wherein the retainer includes a lateral axis (C) parallel to the lateral axis (B) of the seat ring, and the annular side extends from the first portion to the second portion at an angle of 30 degrees or 45 degrees from the first portion.

8. The valve plug assembly of claim 1, wherein the primary angle of the primary portion of the seating surface of the seat ring is 45 degrees, and the annular side of the retainer extends from the first portion to second portion at an angle of 45 degrees.

9. The valve plug assembly of claim 8, wherein the secondary portion extends outwardly from the primary portion at a secondary angle of 10 degrees.

10. The valve plug assembly of claim 1, wherein the first portion of the retainer contacts the sealing surface of the sealing disk.

11. A fluid control device, comprising:
    a valve body defining a flow path for a fluid;
    a seat ring disposed within the flow path and having a seating surface, the seating surface of the seat ring having a primary portion with a primary angle extending any one of at or between 20 degrees to 45 degrees from a longitudinal axis (A) of the seat ring, and a secondary portion extending from a bottom end of the primary portion so as to form an obtuse angled recess facing the sealing surface of the sealing disk at a non-parallel angle from a lateral axis (B) of the seat ring; and
    an actuator coupled to the valve body including a control assembly adapted for displacement relative to the seat ring for regulating a flow of the fluid through the flow-path, the control assembly including a mounting portion and a valve plug assembly coupled to the mounting portion and adapted to sealingly engage the seat ring, the valve plug assembly comprising:
    a valve plug having a cylindrical body, an annular flange radially extending from the body, and a sealing disk disposed within the annular flange, the sealing disk having a sealing surface adapted to engage the seating surface of the seat ring, and
    a retainer coupled to the valve plug to secure the valve plug to the mounting portion, the retainer having a body with a first portion, a second portion, and an annular side extending from the first portion to the second portion at any one of 30 degrees to 45 degrees.

12. The device of claim 11, wherein the primary angle of the primary portion of the seating surface is 45 degrees from the longitudinal axis (A) of the seat ring.

13. The device of claim 11, wherein the lateral axis (B) is perpendicular to the longitudinal axis (A) of the seat ring.

14. The device of claim 13, wherein the secondary portion extends from the primary portion at an angle of 10 degrees from the lateral axis (B) of the seat ring.

15. The device of claim 13, wherein the primary portion extends from the longitudinal axis of the seat ring at an angle of 45 degrees or 30 degrees.

16. The device of claim 13, wherein the seat ring further includes a first end and a second end, the first end including the primary portion and the second end having a tapered surface.

17. The device of claim 11, wherein the retainer includes a lateral axis (C) parallel to the lateral axis (B) of the seat ring, and the annular side extends from the first portion to the second portion at an angle of 30 degrees or 45 degrees from the first portion.

18. The device of claim 11, wherein the primary angle of the primary portion is 45 degrees, and the annular side of the retainer extends from the first portion to the second portion at an angle of 45 degrees.

19. The device of claim 18, wherein the secondary portion extends outwardly from the primary portion at a secondary angle of 10 degrees.

20. A valve plug assembly adapted for sealing engagement with a seat ring, the valve plug assembly comprising:

a valve plug having a cylindrical body, an annular flange radially extending from the body, and a sealing disk disposed within the annular flange, the sealing disk having a sealing surface adapted to engage a seating surface of the seat ring, the seating surface of the seat ring having a primary portion with a primary angle that is not perpendicular to a longitudinal axis (A) of the seat ring and a secondary portion extending from a bottom end of the primary portion so as to form an obtuse angled recess facing the sealing surface of the sealing disk at a secondary angle that is not parallel to a lateral axis (B) of the seat ring; and a retainer coupled to the valve plug to secure the valve plug to a mounting portion, the retainer having a body with a first portion, a second portion and an annular side extending from the first portion to the second portion at an angle.

\* \* \* \* \*